United States Patent
Matsuoka

(10) Patent No.: US 8,792,350 B2
(45) Date of Patent: Jul. 29, 2014

(54) NETWORK RELAY SYSTEM, NETWORK RELAY DEVICE, AND CONGESTED STATE NOTIFYING METHOD

(75) Inventor: Naoki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 13/233,081

(22) Filed: Sep. 15, 2011

(65) Prior Publication Data
US 2012/0163176 A1 Jun. 28, 2012

(30) Foreign Application Priority Data
Dec. 22, 2010 (JP) .................................. 2010-286690

(51) Int. Cl.
*H04L 12/26* (2006.01)
(52) U.S. Cl.
USPC ............................ 370/235; 370/229; 709/235
(58) Field of Classification Search
USPC ............... 370/229–240, 250, 395.71–395.72, 370/412–417; 709/235
See application file for complete search history.

(56) References Cited

U.S. PATENT DOCUMENTS

| 5,440,547 | A | * | 8/1995 | Easki et al. ................ 370/395.3 |
| 5,444,702 | A | * | 8/1995 | Burnett et al. ................ 370/254 |
| 5,719,853 | A | * | 2/1998 | Ikeda ............................ 370/229 |
| 6,046,983 | A | * | 4/2000 | Hasegawa et al. ......... 370/236.1 |
| 6,169,727 | B1 | * | 1/2001 | Song ............................ 370/235 |
| 6,418,119 | B1 |  | 7/2002 | Hatta et al. |
| 6,614,756 | B1 | * | 9/2003 | Morgenstern et al. ........ 370/230 |
| 6,907,001 | B1 | * | 6/2005 | Nakayama et al. ........... 370/230 |
| 6,957,270 | B1 | * | 10/2005 | Erimli et al. .................. 709/235 |
| 7,130,270 | B2 | * | 10/2006 | Alferness et al. ............. 370/235 |
| 7,130,271 | B1 |  | 10/2006 | Sekihata |
| 7,180,857 | B2 |  | 2/2007 | Kawakami et al. |
| 8,358,651 | B1 | * | 1/2013 | Kadosh et al. ................ 370/360 |
| 2002/0118641 | A1 | * | 8/2002 | Kobayashi ..................... 370/230 |
| 2002/0136163 | A1 | * | 9/2002 | Kawakami et al. ........... 370/229 |
| 2003/0099195 | A1 | * | 5/2003 | Lee ............................... 370/229 |
| 2004/0213247 | A1 | * | 10/2004 | Seki et al. .................. 370/395.1 |
| 2004/0223452 | A1 | * | 11/2004 | Santos et al. .................. 370/229 |
| 2008/0298248 | A1 | * | 12/2008 | Roeck et al. ................... 370/237 |
| 2009/0052326 | A1 | * | 2/2009 | Bergamasco et al. ......... 370/236 |

(Continued)

FOREIGN PATENT DOCUMENTS

JP 06-177913 0/1994
JP 11-112557 4/1999

(Continued)

OTHER PUBLICATIONS

JPOA—Office Action of Japanese Patent Application 2010-286690 dated Apr. 22, 2014 with full English-language translation.

*Primary Examiner* — Michael Thier
*Assistant Examiner* — Vincelas Louis
(74) *Attorney, Agent, or Firm* — Fujitsu Patent Center

(57) ABSTRACT

A network relay device includes a plurality of ports which input and output data packets, a storage in which a destination to which an input data packet is to be transferred and identification information of a port that outputs the input data packet are associated with each other for each of the plurality of ports, and a transmitter which obtains from the storage a destination associated with a port to which a data packet responsible for a congested state of traffic is input out of the plurality of ports, and which transmits a notification of congestion to the obtained destination.

11 Claims, 15 Drawing Sheets

(56) References Cited

U.S. PATENT DOCUMENTS

| | | | |
|---|---|---|---|
| 2010/0097944 A1* | 4/2010 | Wang et al. ................... 370/250 |
| 2010/0246388 A1* | 9/2010 | Gupta et al. .................. 370/225 |
| 2010/0302941 A1* | 12/2010 | Prabhakar et al. ............ 370/230 |
| 2011/0002224 A1 | 1/2011 | Tamura |
| 2011/0032825 A1* | 2/2011 | Minkenberg et al. ......... 370/238 |

FOREIGN PATENT DOCUMENTS

| | | |
|---|---|---|
| JP | 2000-270002 A | 9/2000 |
| JP | 2002-094514 | 3/2002 |
| JP | 2002-223223 A | 8/2002 |
| JP | 2003-258828 | 9/2003 |
| JP | 2008-054199 | 3/2008 |

* cited by examiner

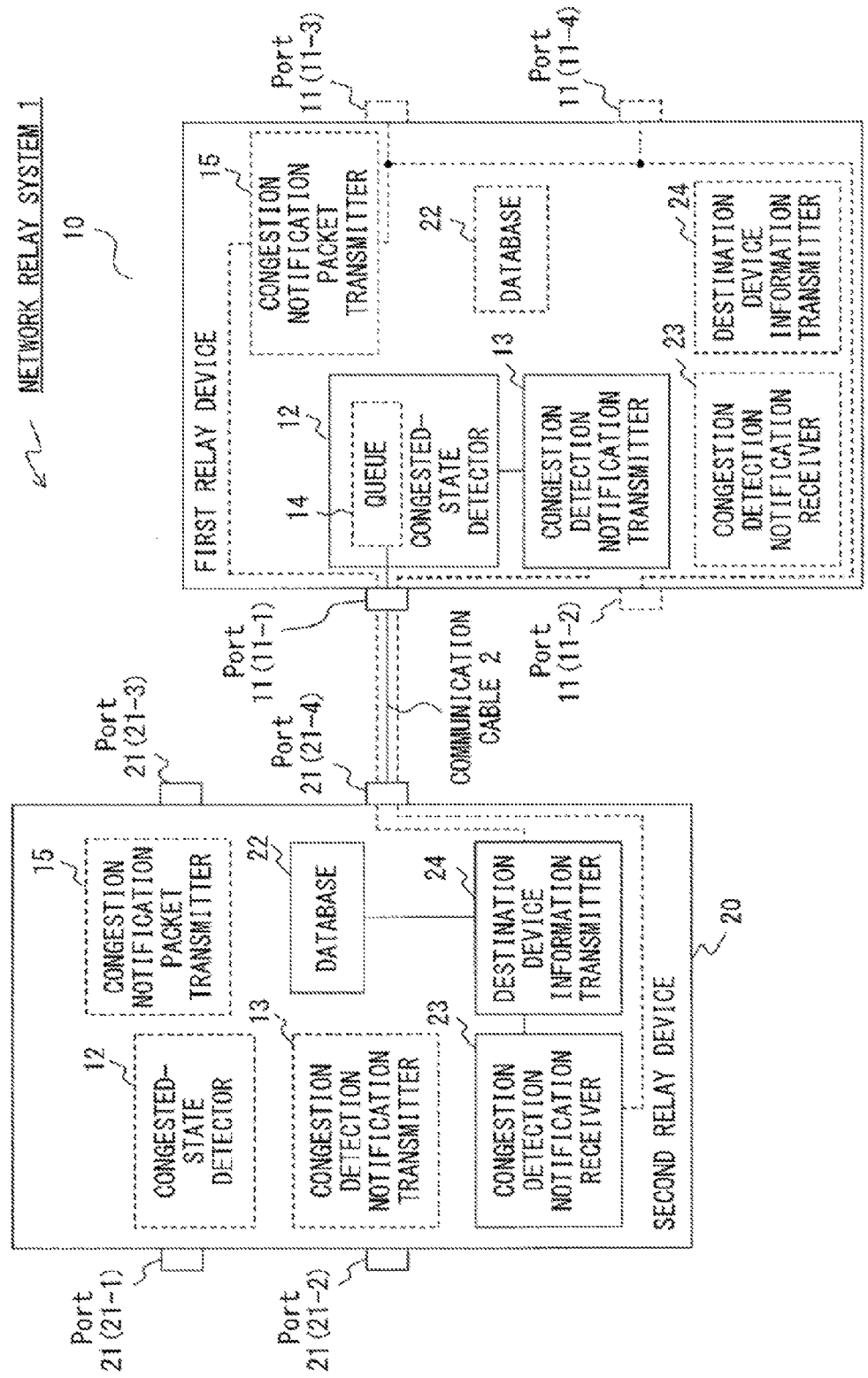
F I G. 1

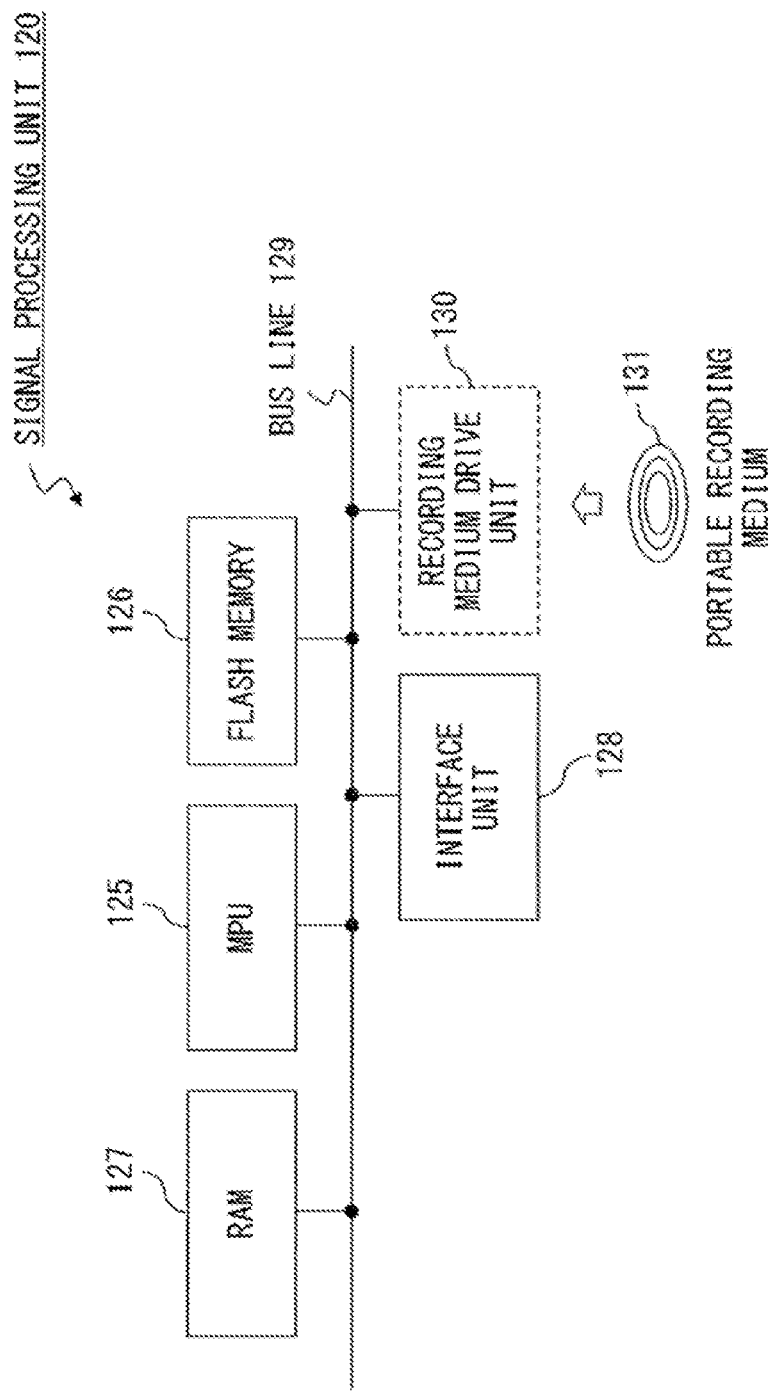
F I G. 3

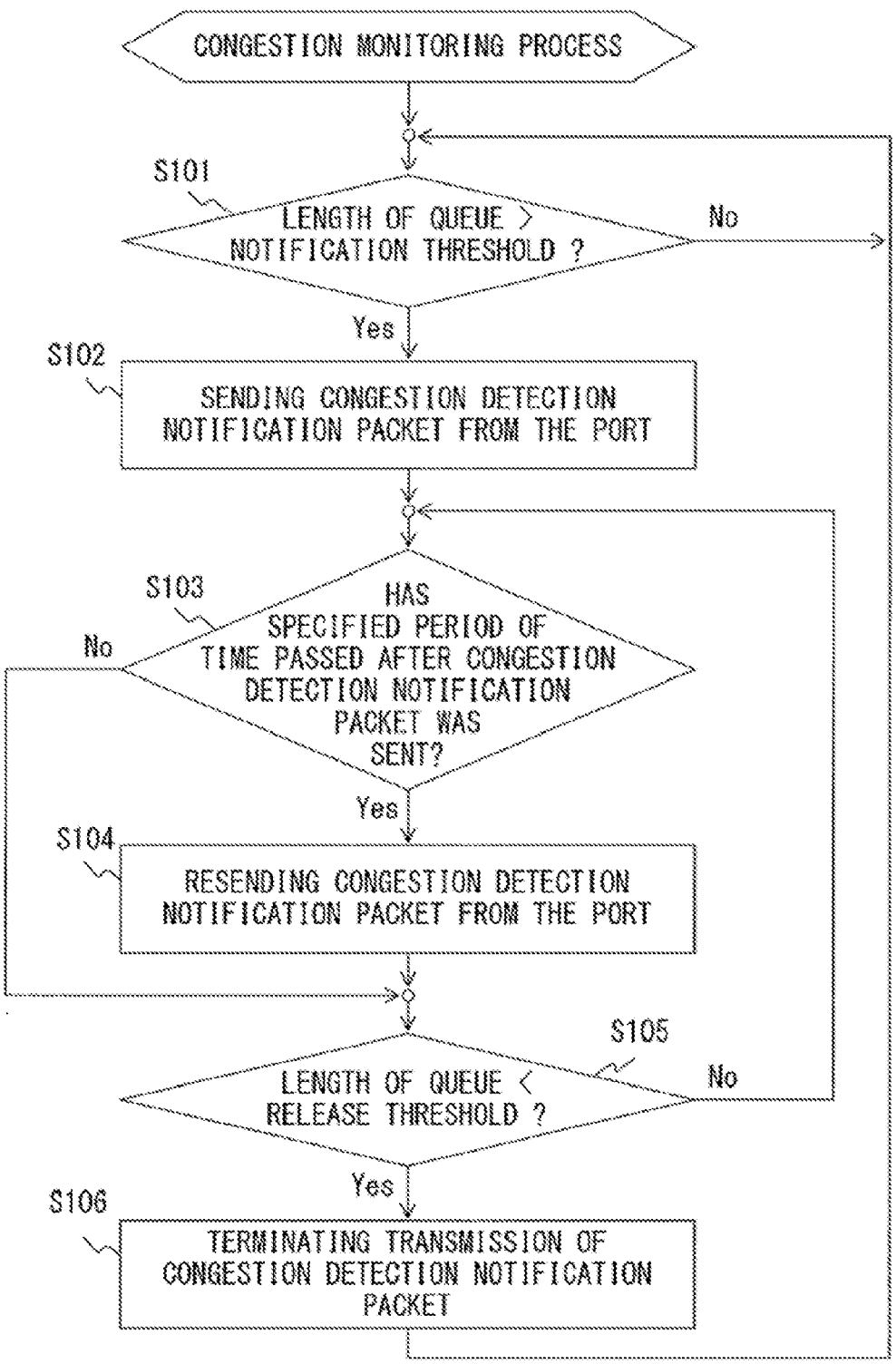
F I G. 4

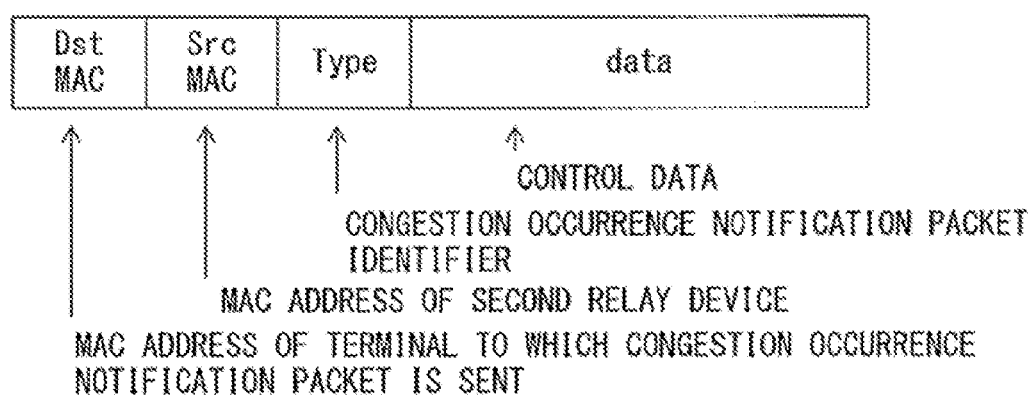
F I G. 7

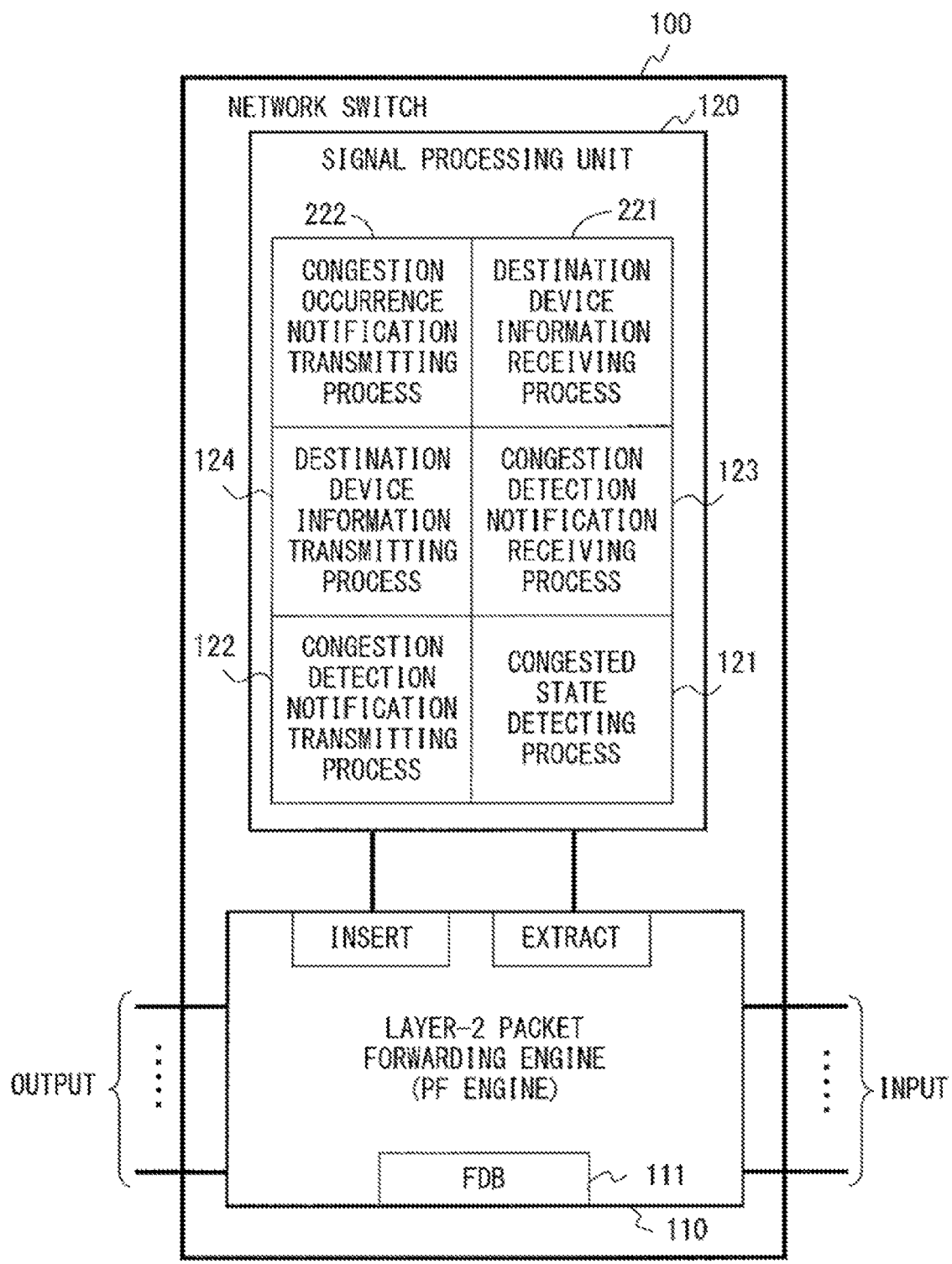
F I G. 10

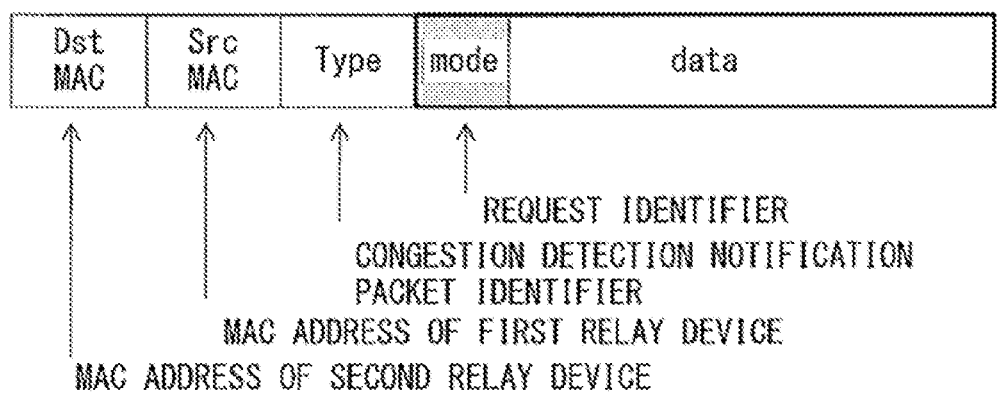
F I G. 11

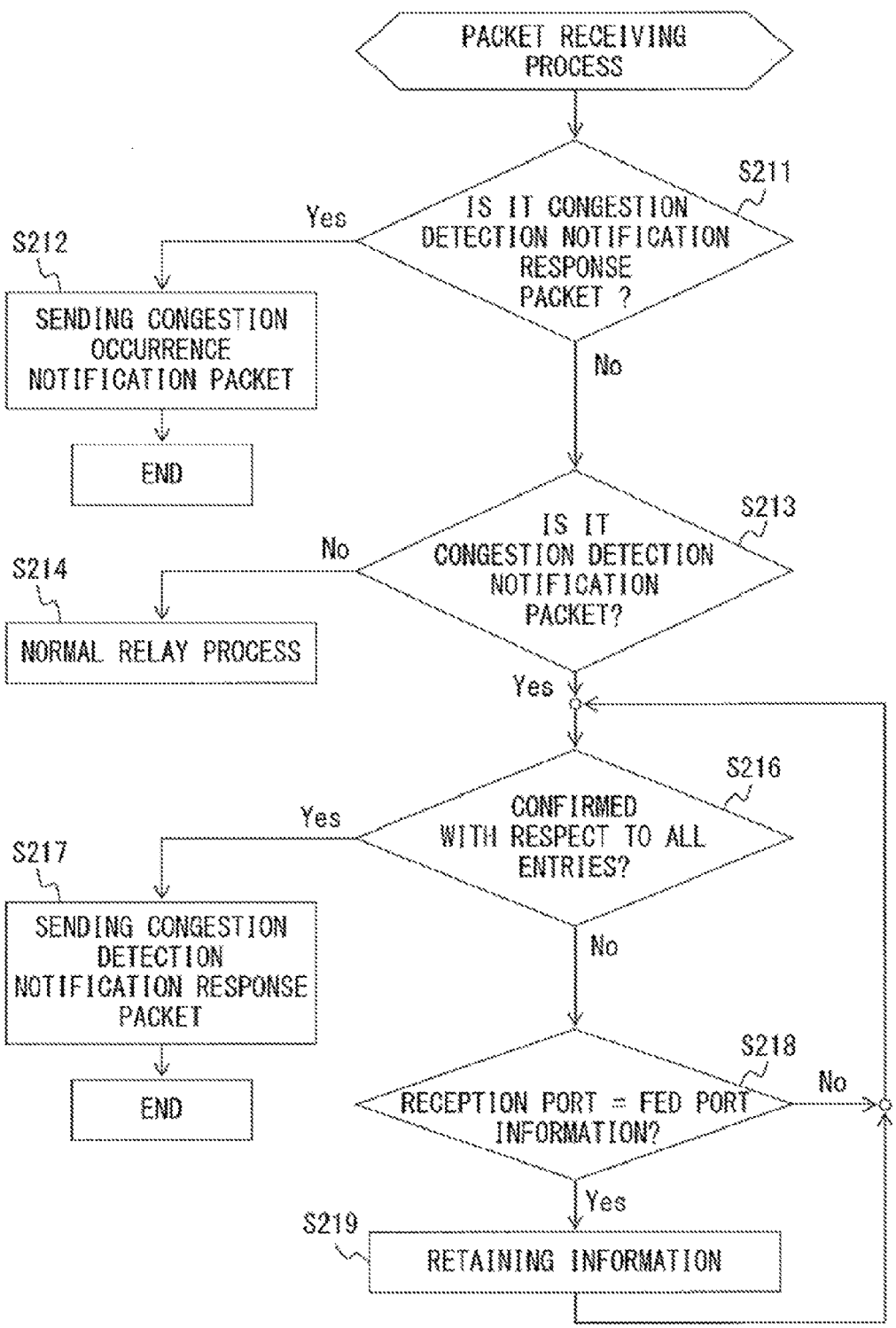
F I G. 1 2

NETWORK RELAY SYSTEM, NETWORK RELAY DEVICE, AND CONGESTED STATE NOTIFYING METHOD

CROSS-REFERENCE TO RELATED APPLICATIONS

This application is based upon and claims the benefit of priority of the prior Japanese Patent Application No. 2010-286690, filed on Dec. 22, 2010, the entire contents of which are incorporated herein by reference.

FIELD

The embodiments discussed herein are related to the technology of controlling data flow in communication networks.

BACKGROUND

CEE (Converged Enhanced Ethernet) is an extended version of Ethernet (Registered Trademark), both of which are standards for communication networks, and the standardization of CEE has now been widely achieved. As the standardization of CEE develops, the integration of LAN (Local Area Network) and SAN (Storage Area Network) has been advancing, and now FCoE (Fiber Channel over Ethernet) technology in which the data flow of FC (Fiber Channel) protocols is sent over the Ethernet network is utilized.

Originally, FC protocols were not developed on the assumption that a packet loss would occur on the communication network. For this reason, when the data of FC protocols is sent over the Ethernet network, it is necessary to achieve a communication in which the loss of communication packets in the network is zero. In the above-mentioned standardization of CEE, such communication is realized by using the congestion control standards referred to as IEEE802.1Qau.

The processes in the IEEE802.1Qau standards are summarized as follows.

Firstly, the length of a queue for each output port of the network device is monitored. Here, the output port at which the length of a queue is larger than or equal to a specified value is determined to be in a congested state, and one data flow is selected from the data traffic flowing through the output port that was determined to be in a congested state. Then, a congestion notification packet is sent to a terminal that is the source of the identified data flow. The source terminal that received the congestion notification packet lowers the transmission rate of the data to be subsequently transmitted, and thereby prevents the continuation of the congested state of the output port.

In IEEE802.1Qau standards, when an output port is congested, it takes a long time to resolve the congestion, as congestion notification is sent only to the source of one data flow arbitrarily selected from the data traffic running through the output port (congested port). It is desirable to give congestion notification to all the sources of data flowing through the congested port. In view of the above, some techniques have been proposed, as below.

In the first technique, a switch itself is provided with hardware that provides the function of monitoring the traffic running through the output ports of the Ethernet switch. In this technique, when an output port is congested, the sources of all the data flow forming the data traffic through the congested port are specified by using the management information that is created by monitoring the data traffic. Then, congestion notification packets are sent to all the specified sources. However, in this technique, the heavy-load processes of monitoring the data traffic and specifying all the data flow through each output port are performed by the switch, and thereby it is necessary to provide the switch with new additional hardware.

In the second technique, every time a data packet arrives at the Ethernet switch, the switch determines whether the output port is congested in order to resolve the port that outputs the packet by using the FDB (Forwarding Database). In this technique, when it is determined that an output port is in a congested state, a congestion notification packet in which the MAC address of the source of a data packet indicated in the arriving data packet is set as the destination address is sent. However, in this technique, even if congestion is detected, a congestion notification packet is sent only to the source of the arriving data packet. Accordingly, a congestion notification packet is not sent, for example, to the sources of other data flows that perform intermittent communication. For this reason, when for example a large number of data packets are transmitted from sources that have not received congestion notification despite the ongoing congestion, the disposal of a large number of data packets or the existence of an extended delay time due to the delay in resolving the congestion is a concern.

Techniques reffered to in the following documents are known.
Document 1:
    Japanese Laid-open Patent Publication No. 2000-270002
Document 2:
    Japanese Laid-open Patent Publication No. 2002-223223

SUMMARY

According to an aspect of the embodiment, a network relay system includes a first relay device and a second relay device, wherein the first relay device includes: a first port, connected to the second relay device, which inputs and outputs data packets; a detector which detects a congested state of traffic of data packets to be transferred from the first port to the second relay device; and a first transmitter which transmits a detection notification indicating a detection of the congested state to the second relay device when the congested state is detected, and the second relay device includes: a plurality of ports which input and output data packets; a storage in which a destination to which the input data packet is to be transferred and identification information of a port that outputs the input data packet are associated with each other for each of the plurality of ports; a receiver to receive the detection notification from the first relay device; and a second transmitter which obtains from the storage a destination associated with a port connected to the first relay device out of the plurality of ports when the detection notification is received, and which transmits a notification of congestion to the obtained destination.

According to another aspect of the embodiment, a network relay device includes: a plurality of ports which input and output data packets; a storage in which a destination to which the input data packet is to be transferred and identification information of a port that outputs the input data packet are associated with each other for each of the plurality of ports; and a first transmitter which obtains from the storage a destination associated with a port to which a data packet responsible for a congested state of traffic is input out of the plurality of ports, and which transmits a notification of congestion to the obtained destination.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a block diagram of a network relay system according to an embodiment.

FIG. 3 illustrates an example of the hardware configuration of a signal processing unit.

FIG. 4 is a flow chart illustrating congestion monitoring processes.

FIG. 7 illustrates an example of the structure of a congestion occurrence notification packet.

FIG. 10 illustrates the second example of a specifically configured network switch.

FIG. 11 illustrates the second example of the structure of a congestion detection notification packet.

FIG. 12 is a flow chart illustrating the second example of packet receiving processes.

DESCRIPTION OF EMBODIMENTS

Figure 2:
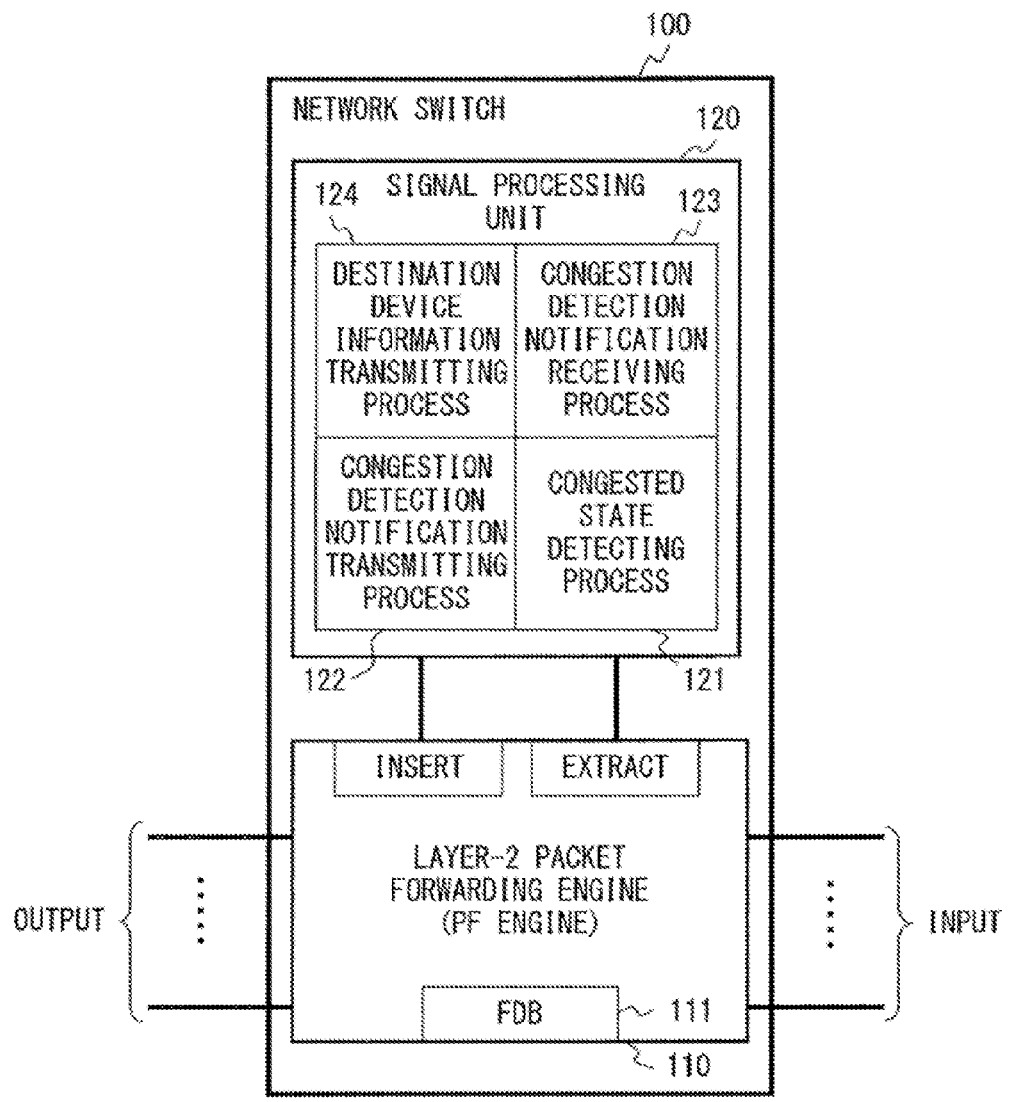
FIG. 2 illustrates the first example of a specifically configured network switch.

Preferred embodiments of the present invention will be explained with reference to accompanying drawings.

Firstly, FIG. 1 will be described. FIG. 1 is a block diagram of a network relay system according to an embodiment.

The network relay system 1 is provided with a first relay device 10 and a second relay device 20.

The first relay device 10 includes ports 11-1, 11-2, 11-3, and 11-4 that input and output a data packet, and the second relay device 20 includes ports 21-1, 21-2, 21-3, and 21-4 in a similar manner. In FIG. 1, the first relay device 10 and the second relay device 20 both have four ports; however, the number of ports may be any plural number.

In the network relay system 1 of FIG. 1, the port 11-1 of the first relay device 10 is physically connected to the second relay device 20 via a communication cable 2.

Hereinafter, when it is not necessary to distinguish between ports 11-1, 11-2, 11-3, and 11-4, the ports will just be referred to as "ports 11". In a similar manner, when it is not necessary to distinguish between ports 21-1, 21-2, 21-3, and 21-4, the ports will just be referred to as "ports 21".

In addition to the ports 11, the first relay device further includes a congested-state detector 12 and a congestion detection notification transmitter 13.

The congested-state detector 12 detects the congested state of the data traffic that is sent from the port 11-1 to the second relay device 20. The congested state is detected, for example, by detecting that the length of a queue 14 in which the data packet output from the port 11-1 is temporarily stored exceeds a specified first threshold.

When the congested-state detector 12 detects the congested state as described above, the congestion detection notification transmitter 13 transmits a congestion detection notification, which indicates that the congested state is detected, to the relay device 20 in the congested state that is the output-destination device of the data traffic. The congestion detection notification is transmitted from the port 11-1 to the port 21-4 of the second relay device 20 via the communication cable 2.

The congested-state detector 12 may be configured to further detect that the congested state of the data traffic that is sent from the port 11-1 to the second relay device 20 is resolved. When the congested-state detector 12 detects that the congested state is resolved, the congestion detection notification transmitter 13 may stop transmitting the congestion detection notification. The congested-state detector 12 detects that the congested state is resolved by, for example, detecting that the length of the queue 14 has become shorter than a specified second threshold that is shorter than the first threshold.

In addition to the ports 21, the second relay device 20 further includes a database 22, a congestion detection notification receiver 23, and a destination device information transmitter 24.

In the database 22, the identification information of a destination device of a data packet to be input to each of the ports 21 is stored in association with the port 21 through which the data packet is sent to the destination device when the data packet is output.

The second relay device 20 may be configured to be a layer-2 switch (i.e., a switch that uses the data of the second layer (data link layer) of an OSI (Open Systems Interconnection) reference model for routing a data packet). When the second relay device 20 is configured to be a layer-2 switch, an FDB (Forwarding Database) may be used as the database 22. When a FDB is used as the database 22, a MAC address (Media Access Control Address) is used as the above-described identification information of a destination device.

The congestion detection notification receiver 23 receives the above-described congestion detection notification transmitted from the congestion detection notification transmitter 13 of the first relay device 10, which is the source of the congested data traffic.

The destination device information transmitter 24 transmits from the port 21 the identification information of a destination device which is associated with the port 21-4 to which the first relay device 10 is physically connected in the database 22. The destination device information transmitter 24 transmits the identification information of a destination device when, for example, the congestion detection notification receiver 23 receives a congestion detection notification.

As described above, the second relay device 20 includes the database 22 in which the identification information of the destination device that is the destination of a data packet is stored in association with a port that outputs the data packet when the data packet is sent to the destination device. The second relay device 20 appropriately selects a path through which a data packet is sent to the destination device by referring to the database 22. The database 22 is created, for example, by extracting the identification information, which indicates the source of the data packet, from the data packet input through the port 21-4 to which the first relay device 10 is physically connected, and by associating the identification information with the port 21-4. In other words, the second relay device 20 holds in the database 22 the source information of all the data packets, which are input from the port 21-4 to which the first relay device 10 is physically connected and are responsible for the congested data traffic.

On the other hand, the first relay device 10 does not hold the source information of the data packet that is responsible for the congested data traffic at the port 11-1 to which the second relay device 20 is physically connected. For this reason, the network relay system 1 of FIG. 1 is configured such that the destination device information transmitter 24 of the second relay device 20 transmits to the first relay device 10 the above-described information that the first relay device 10 does not hold. Accordingly, it is possible for the first relay device 10 to send the congestion notification to the source of all the data packets that are responsible for the congested data traffic at the port 11-1, and thus it is possible to speedily resolve the congested state. Moreover, even if a data packet performing intermittent communication is included in the congested data traffic, it is possible to send the congestion notification to the source of such a data packet.

In addition, in order to send the congestion notification, the network relay system 1 of FIG. 1 may be configured such that the first relay device 10 further includes a congestion notification packet transmitter 15. The congestion notification packet transmitter 15 receives the above-described identification information of the destination device that is transmitted from the destination device information transmitter 24 of the second relay device 20 in response to the congestion detection notification transmitted by the congestion detection notification transmitter 13, and then transmits a congestion occurrence notification packet. The congestion occurrence notification packet is for reporting the occurrence of the congested state, and the congestion notification packet transmitter 15 transmits the congestion occurrence notification packet to which the identification information of the destination device is added as the destination information of the congestion occurrence notification packet.

In order to send the congestion notification, the device information transmitter 24 of the second relay device 20 may be configured to transmit a congestion occurrence notification packet in which the identification information of a destination device is included as the destination information of the congestion occurrence notification packet. In so doing, it is possible to send congestion notification to the source of all the data packets that constitute the congested data traffic at the port 11-1 without providing the first relay device 10 with the above-described congestion notification packet transmitter 15.

The first relay device 10 and the second relay device 20 may be configured in a similar manner. In such a similar configuration, the second relay device 20 is provided with the congested-state detector 12, the congestion detection notification transmitter 13, and the congestion notification packet transmitter 15 that the first relay device 10 includes. Similarly, the first relay device 10 is provided with the database 22, the congestion detection notification receiver 23, and the destination device information transmitter 24 that the first relay device 20 includes. As described above, the first relay device 10 and the second relay device 20 may be configured in a similar manner.

Next, the operations of the network relay system 1 of FIG. 1 will be further described.

First, the first operation examples will be described with reference to FIG. 2 through FIG. 6. The first operation examples are the operations performed by the second relay device 20 to send a congestion occurrence notification packet.

FIG. 2 will be described first. FIG. 2 illustrates the first example of a specifically configured network switch.

A network switch 100 of FIG. 2 may be used for both the first relay device 10 and the second relay device 20 that are configured in a similar manner as above. In the following description of FIG. 2, for simplicity, the case in which the network switch 100 is used as the first relay device 10 will be described.

The network switch 100 of FIG. 2 includes a layer-2 packet forwarding engine 110 and a signal processing unit 120.

The layer-2 packet forwarding engine 110 first creates an FDB 111. In the FDB 111, a MAC address of the destination device to which a data packet is input through each of the ports 11 and a port through which the data packet is output to the destination device are associated with each other. The layer-2 packet forwarding engine 110 extracts the MAC address of the source from the data packet that is input to each of the ports 11, and associates the MAC address and the port 11 through which the data packet is input with each other in order to create the FDB 111. The FDB 111 is an example of the database 22 of FIG. 1.

Moreover, when the data packet is input through one of the ports 11, the layer-2 packet forwarding engine 110 outputs the data packet through a different one of the ports 11. The port through which the data packet is output is determined by using the FDB 11 as set forth below.

Firstly, the MAC address of the destination device is extracted from the input data packet. Secondly, the FDB 111 is referred to, and the information of a port associated with the extracted MAC address in the FDB 111 is obtained. The port obtained as above is determined to be the port through which the data packet is output.

Furthermore, the layer-2 packet forwarding engine 110 extracts the data packet to be input to each of the ports 11 and sends the extracted data packet to the signal processing unit 120, and the layer-2 packet forwarding engine 110 also inserts the data packet created by the signal processing unit 120 into another group of data packets and outputs the resultant data packet.

In the following description, the layer-2 packet forwarding engine 110 will be referred to as a "PF engine 110".

The signal processing unit 120 performs a congested state detecting process 121, a congestion detection notification transmitting process 122, a congestion detection notification receiving process 123, a destination device information transmitting process 124, and so on. An example of the hardware configuration of the signal processing unit 120 is illustrated in FIG. 3.

The signal processing unit 120 of FIG. 3 includes an MPU 125, a flash memory 126, a RAM 127, and an interface unit 128. These elements are connected with each other via a bus line 129, and several types of data can be exchanged between these elements under the control of the MPU 125.

The MPU (Micro Processing Unit) 125 is a processor that controls the entire operation of the signal processing unit 120.

The flash memory 126 is a nonvolatile substrate memory in which several types of control programs executed by the MPU 125 are recorded. The MPU 125 reads the control program from the flash memory 126 at start-up of the network switch 100 and executes the read control program, thereby enabling the operational control of the elements of the signal processing unit 120. The MPU 125 executes the control program as above, and thereby it is possible for the signal processing unit 120 to perform processes such as the congested state detecting process 121, the congestion detection notification transmitting process 122, the congestion detection notification receiving process 123, and the destination device information transmitting process 124.

The RAM (Random Access Memory) 127 is a substrate memory that is writable and readable at all times, and may be used as a working storage if necessary when the MPU 125 executes several types of control programs.

The interface unit 128 manages the several types of data communication with the PF engine 110.

The flash memory 126 is configured to preliminarily store the above-described control program. Alternatively it may for example be configured such that a control program transmitted from a terminal device on the communication network to which the network switch 100 is connected is received via the PF engine 110 and the interface unit 128, and the received control program is written into the flash memory 126. Further, it may be configured such that a recording medium drive unit 130 is further provided for the signal processing unit 120, and the recording medium drive unit 130 reads a control program recorded in a portable recording medium 131 and writes the read control program into the flash memory 126. The portable recording medium 131 includes, for example, a flash memory having a USB (Universal Serial Bus) connector, a CD-ROM (Compact Disc Read Only Memory), and a DVD-ROM (Digital Versatile Disc Read Only Memory).

Next, the control processes performed by the MPU 125, i.e., congestion monitoring processes and packet receiving processes, will be described. These processes are implemented as the MPU 125 executes a control program that is recorded in the flash memory 126.

Firstly, the congestion monitoring process will be described. FIG. 4 is a flow chart illustrating the congestion monitoring processes.

The congestion monitoring processes are performed such that the signal processing unit 120 will be able to perform the congested state detecting process 121 and the congestion detection notification transmitting process 122, and are individually performed for each of the ports 11 of the network switch 100 in a parallel manner. The congestion monitoring processes are initiated when the network switch is activated.

In the description of FIG. 4, the case in which the network switch 100 is used as the first relay device 10 will be described.

In FIG. 4, firstly, in S101, the MPU 125 determines whether or not the length of a queue in which a data packet output from the port 11 is temporarily stored exceeds a specified notification threshold. This queue is included in the PF engine 110, but illustration of it is omitted in FIG. 2. In the determination process of S102, the occurrence of congested data traffic at the port 11 is detected.

In the determination process of S101, when it is determined that the length of a queue exceeds a notification threshold (when the result of determination is "Yes"), it proceeds to the process of S102. On the other hand, when it is determined that the length of a queue is less than or equal to a notification threshold (when the result of determination is "No"), the process of S101 is repeated until the length of a queue exceeds a notification threshold and the result of determination becomes "Yes".

In S102, the MPU 125 controls the PF engine 110 to send from the port 11 a congestion detection notification packet, which is the data packet for detecting the occurrence of congested data traffic at the port 11.

Figure 5:
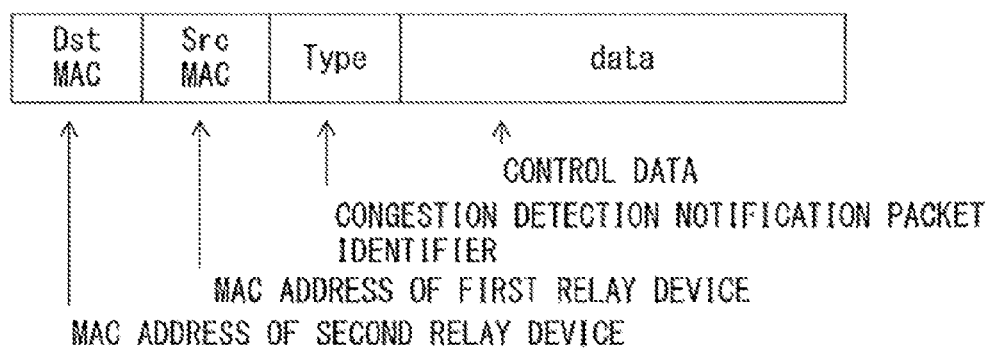
FIG. 5 illustrates the first example of the structure of a congestion detection notification packet.

Here, FIG. 5 will be described. FIG. 5 illustrates the first example of the structure of a congestion detection notification packet.

As illustrated in FIG. 5, the congestion detection notification packet includes the data storage areas "Dst MAC", "Src MAC", "Type", and "data".

In "Dst MAC", the MAC address of a device that is the destination of a congestion detection notification packet is stored. Accordingly, when the destination of a congestion detection notification packet is the second relay device 20, the MAC address assigned to the second relay device 20 is stored in "Dst MAC".

In "Src MAC", the MAC address of a device that is the source of a congestion detection notification packet is stored. Accordingly, when the source of a congestion detection notification packet is the first relay device 10, the MAC address assigned to the first relay device 10 is stored in "Src MAC".

In "type", identification data indicating that the data packet is a congestion detection notification packet is stored.

Although control data is stored in "data", it is not always necessary to store the control data in a congestion detection notification packet, and thus the control data may not be stored in a congestion detection notification packet when it is not necessary.

Returning to the description of FIG. 4, the processes of S103 to S106 are for repeatedly sending a congestion detection notification packet at specified time intervals until the congested data traffic at the port 11 is resolved.

In S103, firstly, the MPU 125 determines whether a specified period of time has passed after a congestion detection notification packet was sent. Here, when it is determined that a specified period of time has passed after a congestion detection notification packet was sent (when the result of determination is "Yes"), the process of S105 is proceeded to. On the other hand, when it is determined that a specified period of time has not passed after a congestion detection notification packet was sent (when the result of determination is "No"), the process of S104 is proceeded to.

Next, in S104, the MPU 125 controls the PF engine 110 to resend from the port 11 the same congestion detection notification packet as that sent in the process of S102.

Next, in S105, the MPU 125 determines whether or not the length of a queue, which was described above with reference to the port 11, is less than a specified release threshold. The release threshold is set to a value that is shorter than the above-described notification threshold. When it is determined that the length of a queue is less than a specified release threshold in the determination process of S105 (when the result of determination is "Yes"), the process of S106 is proceeded to. On the other hand, when it is determined that the length of a queue is larger than or equal to a specified notification threshold (when the result of determination is "No"), the process of S103 is returned to.

Next, in S106, the MPU 125 terminates the transmission of a congestion detection notification packet. Subsequently, the process of S101 is returned to, and the process of detecting the occurrence of congested data traffic at the port 11 is resumed.

The congestion monitoring processes have been described above, and if the processes are performed by the MPU 125, the functions of the congested-state detector 12 and the congestion detection notification transmitter 13 as in FIG. 1 are provided by the network switch 100 of FIG. 2.

Figure 6:
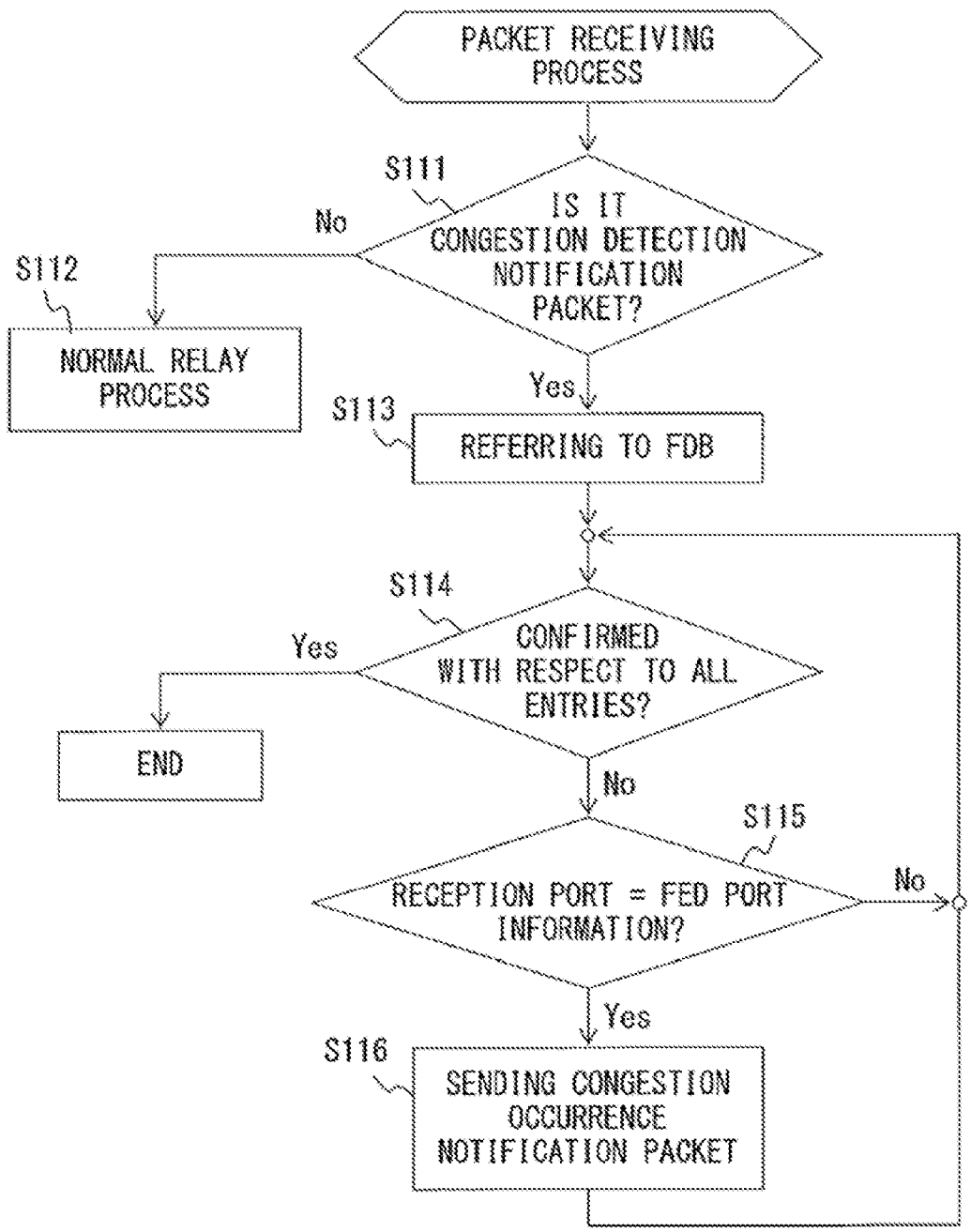
FIG. 6 is a flow chart illustrating the first example of packet receiving processes.

The packet receiving processes will be described below. FIG. 6 illustrates the first example of packet receiving processes by using a flow chart.

In the packet receiving processes, the signal processing unit 120 performs the congestion detection notification receiving process 123 and the destination device information transmitting process 124. The packet receiving processes start every time the network switch 100 receives a new data packet from the ports 21.

In the description of FIG. 6, the case in which the network switch 100 is used as the second relay device 20 will be described.

In S111 of FIG. 6, the MPU 125 determines whether or not the received packet is a congestion detection notification packet. When it is determined that the received data packet is a congestion detection notification packet (when the result of determination is "Yes"), the process of S113 is proceeded to. On the other hand, when it is determined that the received data packet is not a congestion detection notification packet (when the result of determination is "No"), the process of S112 is proceeded to, and the PF engine 110 performs a normal relay process of the data packet.

Next, in S113, the MPU 125 refers to the FDB 111 of the PF engine 110.

Next, in S114, the MPU 125 determines whether or not the determination of the later-described process of S115 has been confirmed with respect to all the entries of the FDB 111 that are being referred to. Here, when it is determined that all the entries of the FDB 111 have been confirmed (when the result of determination is "Yes"), the packet receiving processes terminate. On the other hand, when it is determined that there are some remaining entries in the FDB 111 that have not been confirmed (when the result of determination is "No"), the process of S115 is proceeded to.

In S115, attention is focused on one of the entries of the FDB 111 that have not been confirmed, and the MPU 125 determines whether or not the port 21 at which arrived the congestion detection notification packet whose reception was confirmed in S111 matches the information of the port that is indicated in the entry. Here, when it is determined that both of the above match (when the result of determination is "Yes"), the process of S116 is proceeded to. On the other hand, when it is determined that both of the above do not match (when the result of determination is "No"), the process of S114 is returned to, and the processes of S114 and S115 are performed again.

In S116, the MPU 125 controls the PF engine 110 to send a congestion occurrence notification packet from the port 21. After that, the process of S114 is returned to, and the processes of S114 and S115 are performed again.

The congestion occurrence notification packet is a data packet for notifying the source of the data packet constituting the congested data traffic of the occurrence of the congested data traffic. The structure of the congestion occurrence notification packet will be described later. In S116, the MPU 125 controls the PF engine 110 to send a congestion occurrence notification packet to the source of all the data packets that constitute the congested data traffic.

The first example of packet receiving processes has been described above, and if the processes are performed by the MPU 125, the functions of the congestion detection notification receiver 23 and the destination device information transmitter 24 as in FIG. 1 are provided by the network switch 100 of FIG. 2.

Here, FIG. 7 will be described. FIG. 7 illustrates an example of the structure of a congestion occurrence notification packet.

As illustrated in FIG. 7, the congestion occurrence notification packet includes the data storage areas "Dst MAC", "Src MAC", "Type", and "data".

In "Dst MAC", the MAC address of a device to which a congestion occurrence notification packet is sent is stored. The MAC address stored in "Dst MAC" is the address that used to be associated in the FDB 111 with the port 21 at which the congestion detection notification packet whose reception is confirmed arrived.

In "Src MAC", the MAC address of a device from which a congestion occurrence notification packet is sent is stored. Accordingly, when the source of a congestion occurrence notification packet is the first relay device 20, the MAC address assigned to the first relay device 20 is stored in the "Src MAC".

In "type", identification data indicating that the data packet is a congestion occurrence notification packet is stored.

Although control data is stored in "data", it is not always necessary to store the control data in the congestion occurrence notification packet, and the control data may not be stored in the congestion occurrence notification packet when it is not necessary.

Next, how the data packets are transferred according to the above-described first operation examples of the network relay system 1 of FIG. 1 will be further described with reference to FIG. 8 and FIG. 9.

Figure 8:
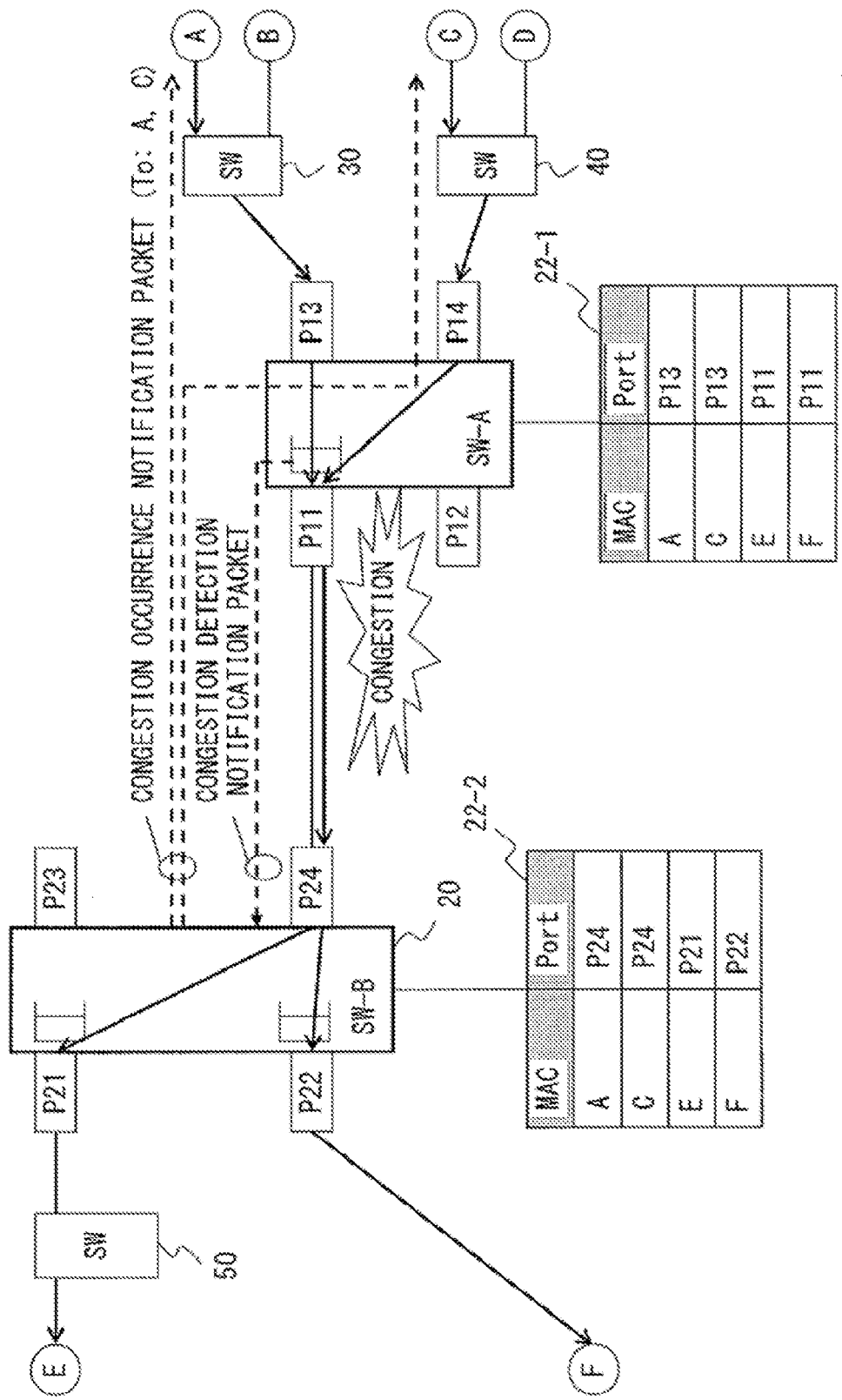
FIG. 8 illustrates the first example of the flow of a data packet in a network relay system.
Figure 9:
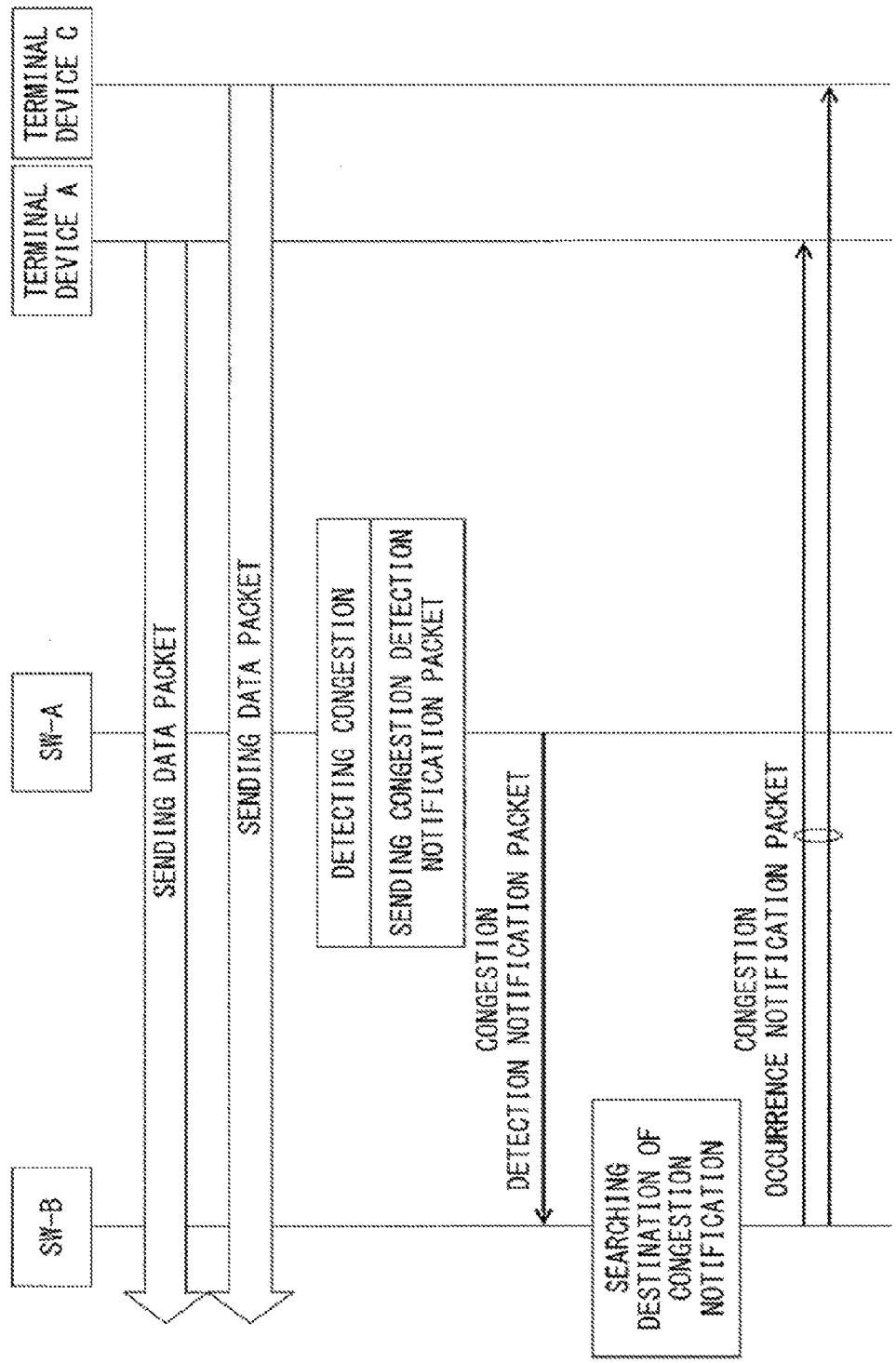
FIG. 9 is a sequence diagram illustrating the flow of a data packet of FIG. 8.

FIG. 8 illustrates the first example of the flow of a data packet in the network relay system 1. FIG. 9 is a sequence diagram that more precisely illustrates the flow of a data packet in FIG. 8.

In FIG. 8, the first relay device 10 is referred to as "SW-A", and the second relay device 20 is referred to as "SW-B". Moreover, the ports 11-1, 11-2, 11-3, and 11-4 provided for the first relay device 10 are referred to as "P11", "P12", "P13", and "P14", respectively. Furthermore, the ports 21-1, 21-2, 21-3, and 21-4 provided for the second relay device 20 are referred to as "P21", "P22", "P23", and "P24", respectively.

In the network configuration assumed in the example of FIG. 8, a switch 30 is connected to P13 of the SW-A, and a terminal device A and a terminal device B are connected to the switch 30. Moreover, a switch 40 is connected to P14 of the SW-A, and a terminal device C and a terminal device D are connected to the switch 40. On the other hand, a switch 50 is connected to P21 of the SW-B, and a terminal device E is connected to the switch 50. Moreover, a terminal device F is directly connected to P22 of the SW-B, and P11 of the SW-A and P24 of the SW-B are physically and directly connected to each other.

In FIG. 8, a database 22-1 is the FDB 111 provided for the network switch 100, i.e., the SW-A, and a database 22-2 is the FDB 111 provided for the network switch 100, i.e., the SW-B. The database 22-1 represents the relationship between the MAC address of a terminal device that is the source of a data packet input to the SW-A and the port of the SW-A to which the data packet is input. Moreover, the database 22-2 represents the relationship between the MAC address of a terminal device that is the source of a data packet input to the SW-B and the port of the SW-B to which the data packet is input.

In the example of FIG. 8, it is assumed that communication is performed between the terminal device A and the terminal device E and between the terminal device C and the terminal device F, respectively. The SW-A obtains the relationship between the source information indicated in data packets exchanged between the terminal device A and the terminal device E and between the terminal device C and the terminal device F and the port to which the data packets are input, and thereby creates the database 22-1. The SW-B also obtains the relationship between the source information indicated in data packets and the port to which the data packets are input, and thereby creates the database 22-2.

In the example of FIG. 8, the case will be described in which the data traffic is congested at P11 of the SW-A as a large number of data packets are sent from the terminal device A to the terminal device E, and concurrently, a large number of data packets are sent from the terminal device C to the terminal device F.

In such a case, it is detected that the length of a queue in which a data packet output from P11 is temporarily stored exceeds the above-described notification threshold, and the congested-state detector 12 of the SW-A detects the occurrence of congested data traffic at P11 of the SW-A. Then, the congestion detection notification transmitter 13 of the SW-A transmits a congestion detection notification packet to be sent from the P11 to the SW-B. As described above, the congestion detection notification packet is repeatedly sent at specified time intervals.

The data packet sent from P11 of the SW-A is received by the congestion detection notification receiver 23 via P24 of the SW-B, and it turns out that the received data packet is a congestion detection notification packet. Then, the database 22-2 provided for the SW-B is referred to, and the MAC addresses of the terminal device A and the terminal device C are read from the database 22-2 as the MAC addresses that are associated with P24 at which the congestion detection notification packet arrived. Then, the destination device information transmitter 24 of the SW-B transmits from P24 the congestion occurrence notification packet that includes the MAC address of the terminal device A as the destination information and the congestion occurrence notification packet that includes the MAC address of the terminal device C as the destination information. These congestion occurrence notification packets arrive at the terminal device A and the terminal device C via the SW-A. Once the terminal device A and the terminal device C receive congestion occurrence notification packets, the terminal device A and the terminal device C reduce the transmission rate of a data packet to be sent afterwards. As a result, the congested data traffic at P11 of the SW-A is resolved, and it is detected that the above-described length of a queue becomes less than the above-described release threshold. Accordingly, the repeated transmission of a congestion detection notification packet as described above will be terminated.

Next, the second example of the operations of the network relay system 1 of FIG. 1 will be described. The second operation examples are the operations performed by the congestion notification packet transmitter 15 of the first relay device 10 to transmit a congestion occurrence notification packet.

FIG. 10 will be described first. FIG. 10 illustrates the second example of a specifically configured network switch.

The network switch 100 of FIG. 10 includes the PF engine 110 and the signal processing unit 120 in a similar manner as the first example of FIG. 2. However, the signal processing unit 120 of FIG. 10 is different from that of FIG. 2, as the signal processing unit 120 of FIG. 10 further performs a destination device information receiving process 221 and a congestion occurrence notification transmitting process 222, in addition to the processes similar to those of FIG. 2.

The hardware of the signal processing unit 120 of FIG. 10 will not be described here because it is possible to use the same hardware configuration as that of the example of FIG. 3.

Next, the control processes performed by the MPU 125 of the signal processing unit 120 of FIG. 10 will be described. The control processes are provided as the MPU 125 executes the control program recorded in the flash memory 126.

The MPU 125 of the signal processing unit 120 of FIG. 10 performs congestion monitoring processes and packet receiving processes as control processes, as described with reference to FIG. 2. Considering the congestion monitoring processes and the packet receiving processes, the congestion monitoring processes are the same as the processes performed by the MPU 125 of the signal processing unit 120 of FIG. 2, which is illustrated in the flow chart of FIG. 4. For this reason, the congestion monitoring processes will not be described here. However, the structure of a congestion detection notification packet sent in the processes of FIG. 4 is slightly different from the structure of FIG. 5. Hence, the structure of a congestion detection notification packet sent in the processes of FIG. 4 will be described.

Here, FIG. 11 will be described. FIG. 11 illustrates the second example of the structure of a congestion detection notification packet.

As illustrated in FIG. 11, the congestion detection notification packet includes the data storage areas "Dst MAC", "Src MAC", "Type", "mode", and "data".

In "Dst MAC", the MAC address of a device that is the destination of a congestion detection notification packet is stored. Accordingly, when the destination of a congestion detection notification packet is the second relay device 20, the MAC address assigned to the second relay device 20 is stored in "Dst MAC".

In "Src MAC", the MAC address of a device that is the source of a congestion detection notification packet is stored. Accordingly, when the source of a congestion detection notification packet is the first relay device 10, the MAC address assigned to the first relay device 10 is stored in "Src MAC".

In "type", identification data indicating that the data packet is a congestion detection notification packet (or a congestion detection notification response packet, which will be described later) is stored.

In "mode", identification data is stored indicating that the congestion detection notification packet requires a response including the information of a device that is the source of the packet data constituting the congested data traffic.

Even though control data is stored in "data", it is not always necessary to store the control data in a congestion detection notification packet, and the control data may not be stored in the congestion detection notification packet when it is not necessary.

Next, the packet receiving processes performed by the MPU 125 of the signal processing unit 120 will be described. FIG. 12 illustrates the packet receiving processes by using a flow chart.

In the packet receiving processes, the signal processing unit 120 performs the congestion detection notification receiving process 123, the destination device information transmitting process 124, the destination device information receiving process 221, and the congestion occurrence notification transmitting process 222. The packet receiving processes start every time the network switch 100 receives a new data packet from the ports 21.

In the description of FIG. 12, the case in which the network switch 100 is used as the second relay device 20 will be described.

In S211 of FIG. 12, the MPU 125 determines whether or not the received packet is a congestion detection notification response packet. When it is determined that the received data packet is a congestion detection notification response packet (when the result of determination is "Yes"), the process of S212 is proceeded to. On the other hand, when it is determined that the received data packet is not a congestion detection notification response packet (when the result of determination is "No"), the process of S213 is proceeded to.

The congestion detection notification response packet is a packet sent to the source of the congestion detection notification packet in response to the reception of the congestion detection notification packet that has the structure of FIG. 11.

Figure 13:
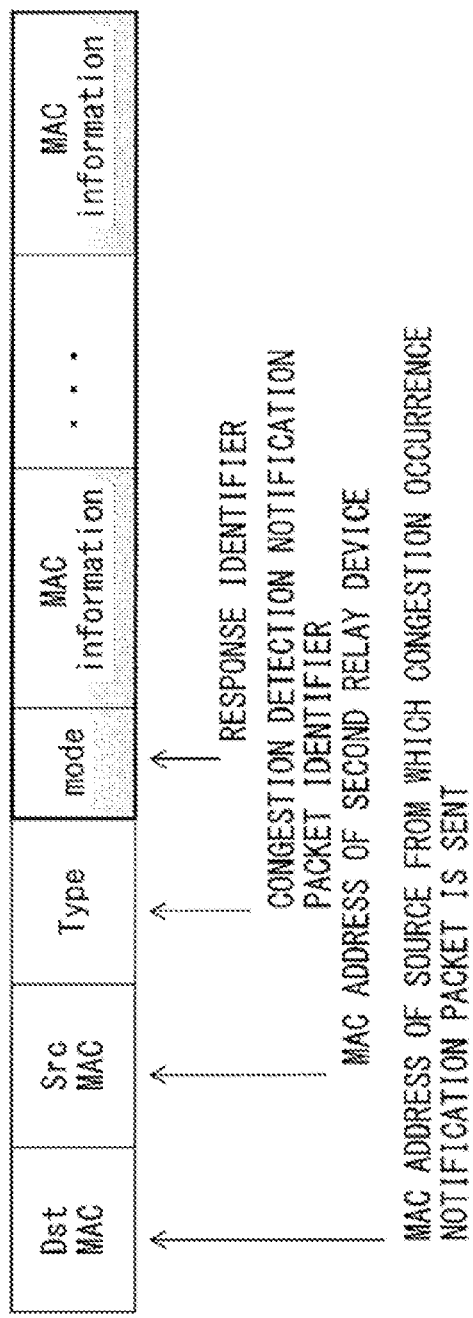
FIG. 13 illustrates an example of the structure of a congestion detection notification response packet.

FIG. 13 illustrates an example of the structure of a congestion detection notification response packet.

As illustrated in FIG. 13, the congestion detection notification response packet includes the data storage areas "Dst MAC", "Src MAC", "Type", "mode", and "MAC information".

In "Dst MAC", the MAC address of a device that is the source of a congestion detection notification packet, which is the destination of a congestion detection notification response packet, is stored. Accordingly, when the source of a congestion detection notification packet is the first relay device 10, the MAC address assigned to the first relay device 10 is stored in "Dst MAC".

In "Src MAC", the MAC address of a device that is the source of a congestion detection notification response packet is stored. Accordingly, when the source of a congestion detection notification response packet is the second relay device 20, the MAC address assigned to the second relay device 20 is stored in "Src MAC".

In "Type", identification data indicating that the data packet is a congestion detection notification response packet (or the above-described congestion detection notification packet) is stored.

In "mode", identification data is stored indicating that the congestion detection notification response packet includes the information of a device that is the source of the packet data constituting the congested data traffic as response information to the congestion detection notification packet. It is possible to distinguish the congestion detection notification packet from the congestion detection notification response packet by the difference in the identification data of the "mode".

In the "MAC information", each one of the MAC addresses of devices that are the sources of all the packet data constituting the congested data traffic is stored.

Returning to the description of FIG. 12, in S212, the MPU 125 controls the PF engine 110 to send congestion occurrence notification packets from output ports, depending on the respective destinations. After that, the packet receiving processes terminate.

The structure of the congestion occurrence notification packet sent in the process of S212 may be, for example, the same as the structure illustrated in FIG. 7. Note that the MAC address stored in the data storage area of the "Dst MAC" in the congestion occurrence notification packet is the address that used to be stored in the "MAC information" in the congestion detection notification response packet whose reception is confirmed in the process of S211. In S212, the MPU 125 controls the PF engine 110 to send the congestion occurrence notification packet to the source of all the data packets that constitute the congested data traffic.

In the processes from S213 to S217 of FIG. 12, the reception of a congestion detection notification packet is detected, and when the reception is detected, a response is made by sending a congestion detection notification response packet.

In S213, firstly, the MPU 125 determines whether or not the received packet is a congestion detection notification packet whose structure is illustrated in FIG. 11. When it is determined that the received data packet is a congestion detection notification packet (when the result of determination is "Yes"), the process of S215 is proceeded to. On the other hand, when it is determined that the received data packet is not a congestion detection notification packet (when the result of determination is "No"), the process of S214 is proceeded to, and the PF engine 110 performs a normal relay process of the data packet.

Next, in S215, the MPU 125 refers to the FDB 111 of the PF engine 110.

Next, in S216, the MPU 125 determines whether or not the determination of the later-described process of S218 has been confirmed with respect to all the entries of the FDB that are being referred to. Here, when it is determined that all the entries of the FDB 111 have been confirmed (when the result of determination is "Yes"), the process of S217 is proceeded to. On the other hand, when it is determined that there are some remaining entries in the FDB 111 that have not been confirmed (when the result of determination is "No"), the process of S218 is proceeded to.

In S217, the MPU 125 controls the PF engine 110 to send from the port 21 a congestion detection notification response packet whose structure is illustrated in FIG. 13. In the data storage area of the "MAC information" of the congestion detection notification response packet, all the MAC addresses retained in the RAM 127 due to the later-described information retention process of S219 are stored.

In S218, attention is focused on one of the entries of the FDB 111 that have not been confirmed, and the MPU 125 determines whether or not the port 21 at which arrived a congestion detection notification packet whose reception was confirmed in S213 matches the information of the port that is indicated in the entry. Here, when it is determined that both of the above match (when the result of determination is "Yes"), the process of S219 is proceeded to. On the other hand, when it is determined that both of the above do not match (when the result of determination is "No"), the process of S216 is returned to, and the process of S216 is performed again.

In S219, the MPU 125 performs an information retention process, and then it returns to the process of S216, and the process of S216 is performed again. In the information retention process, a MAC address that used to be associated in the FDB 111 with a port that is determined in the process of S218 to match the port 21 at which arrived the congestion detection notification packet whose reception was confirmed in S213 is stored in the RAM 127 for retention. Accordingly, in the above-described process of S217, the congestion detection notification response packet whose data storage area "MAC information" stores the MAC address that is stored in the RAM as above is sent.

The second example of packet receiving processes has been described above. If the processes are performed by the MPU 125, the functions of the congestion detection notification receiver 23 and the destination device information transmitter 24, and the function of the congestion notification packet transmitter 15 as in FIG. 1, are provided by the network switch 100 of FIG. 10.

Next, how data packets are transferred according to the above-described second operation examples of the network relay system 1 of FIG. 1 will be further described with reference to FIG. 14 and FIG. 15.

Figure 14:
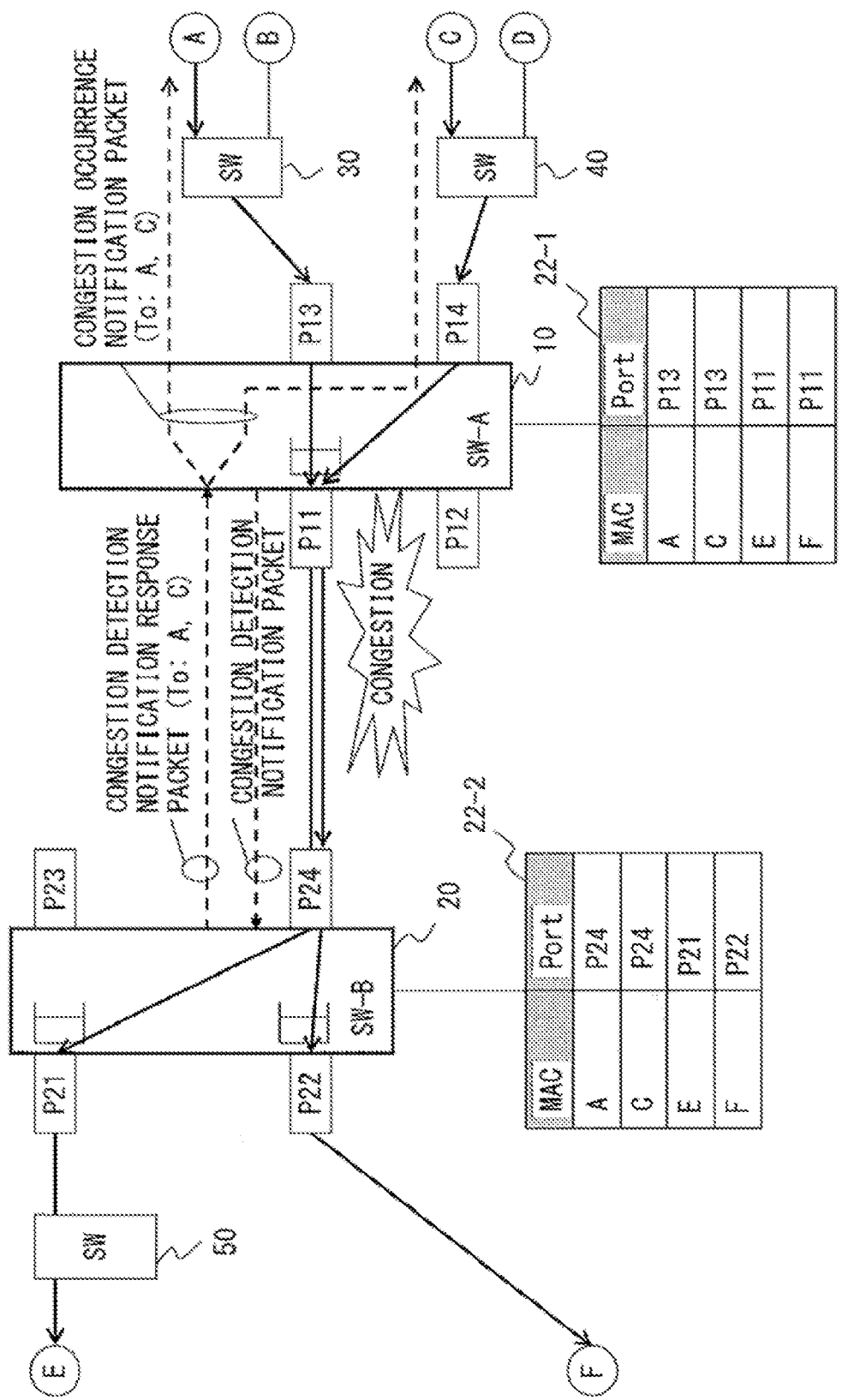
FIG. 14 illustrates the second example of the flow of a data packet in a network relay system.
Figure 15:
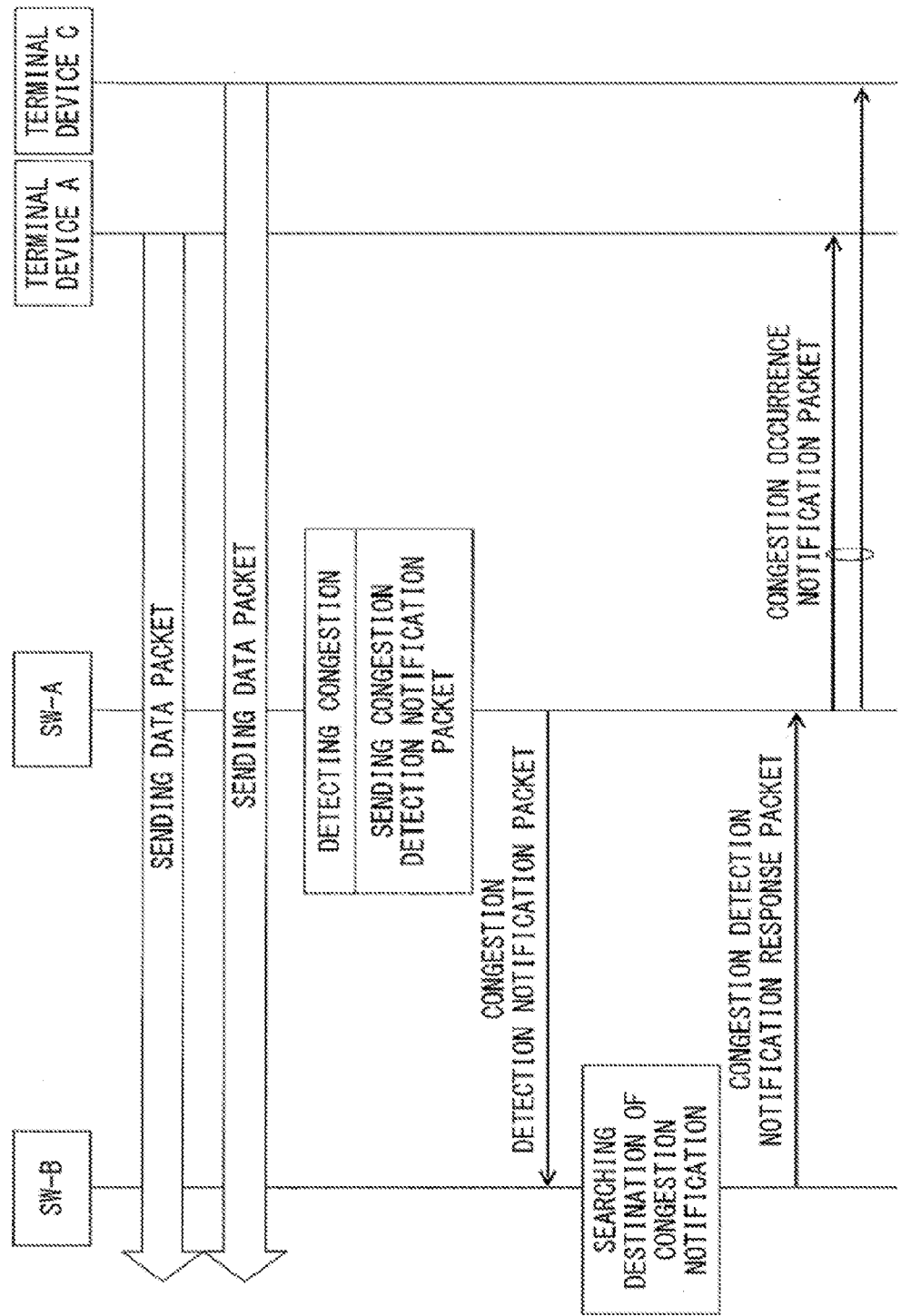
FIG. 15 is a sequence diagram illustrating the flow of a data packet of FIG. 14.

FIG. 14 illustrates the second example of the flow of a data packet in the network relay system 1. FIG. 15 is a sequence diagram that more precisely illustrates the flow of a data packet of FIG. 14.

In FIG. 14, in a similar manner as the description of FIG. 8, the first relay device 10 is referred to as "SW-A" and the second relay device 20 is referred to as "SW-B". Moreover, the ports 11-1, 11-2, 11-3, and 11-4 provided for the first relay device 10 are referred to as "P11", "P12", "P13", and "P14", respectively. Furthermore, the ports 21-1, 21-2, 21-3, and 21-4 provided for the second relay device 20 are referred to as "P21", "P22", "P23", and "P24", respectively.

The network configuration assumed in the example of FIG. 14 is the same as that of the example of FIG. 8. That is, the switch 30 is connected to P13 of the SW-A, and the terminal device A and the terminal device B are connected to the switch 30. Moreover, the switch 40 is connected to P14 of the SW-A, and the terminal device C and the terminal device D are connected to the switch 40. On the other hand, the switch 50 is connected to P21 of the SW-B, and the terminal device E is connected to the switch 50. Moreover, the terminal device F is directly connected to P22 of the SW-B, and P11 of the SW-A and P24 of the SW-B are physically and directly connected to each other.

In FIG. 14, the database 22-1 is the FDB 111 provided for the network switch 100, i.e., the SW-A, and the database 22-2 is the FDB 111 provided for the network switch 100, i.e., the SW-B. This configuration is also similar to that of FIG. 8.

In the example of FIG. 14, in a similar manner as the description of FIG. 8, it is assumed that communication is performed between the terminal device A and the terminal device E and between the terminal device C and the terminal device F, respectively. Here, a case will be described in which the data traffic is congested at P11 of the SW-A as a large number of data packets are sent from the terminal device A to the terminal device E, and concurrently, a large number of data packets are sent from the terminal device C to the terminal device F.

In such a case, it is detected that the length of a queue in which a data packet output from P11 is temporarily stored exceeds the above-described notification threshold, and the congested-state detector 12 of the SW-A detects the occurrence of the congested data traffic at P11 of the SW-A. Then, the congestion detection notification transmitter 13 of the SW-A transmits a congestion detection notification packet to be sent from the P11 to the SW-B. As described above, the congestion detection notification packet is repeatedly sent at specified time intervals.

The data packet sent from P11 of the SW-A is received by the congestion detection notification receiver 23 via P24 of the SW-B, and it turns out that the received data packet is a congestion detection notification packet. Then, the database 22-2 provided for the SW-B is referred to, and the MAC addresses of the terminal device A and the terminal device C are read from the database 22-2 as the MAC addresses that are associated with P24 at which the congestion detection notification packet arrived.

The operations so far are similar to those of the first operation examples of the network relay system, which are described with reference to FIG. 8 and FIG. 9.

Here, when the MAC addresses of the terminal device A and the terminal device C are read from the database 22-2, the destination device information transmitter 24 of the SW-B transmits from P24 the congestion detection notification response packet in which the MAC addresses of the terminal device A and the terminal device C are included as the "MAC information". The congestion detection notification response packet arrives at P11 of the SW-A.

Once the congestion detection notification response packet is received, the congestion notification packet transmitter 15 transmits a congestion occurrence notification packet. At this time, the congestion notification packet transmitter 15 transmits the congestion occurrence notification packet in which the MAC addresses of the terminal device A and the terminal device C that are included in the "MAC information" of the received congestion detection notification response packet are described as the information of destination. At this time, a congestion occurrence notification packet to be sent to the terminal device A is sent from P13 in accordance with the information of the database 22-2. A congestion occurrence notification packet to be sent to the terminal device C is sent from P14 in accordance with the information of the database 22-2.

Once a congestion occurrence notification packet is received, the terminal device A and the terminal device C reduce the transmission rate of a data packet to be sent afterwards. As a result, the congested data traffic at P11 of the SW-A is resolved, and it is detected that the above-described length of a queue becomes less than the above-described release threshold. Accordingly, the repeated transmission of a congestion detection notification packet as described above will be terminated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network relay system comprising:
a first relay device and
a second relay device, wherein the first relay device comprises:
a first port, that inputs and outputs data packets, the first port being connected to the second relay device, wherein the input data packets are received from source terminals;
a detector that detects a congested state of traffic of data packets to be transferred from the first port to the second relay device, the detector detecting the congested state by detecting that a length of a queue in which a data packet to be output from the first port is temporarily stored exceeds a specified first threshold, and after the congested state is detected, detecting that the congested state is resolved by detecting that the length of the queue becomes smaller than a specified second threshold that is shorter than the specified first threshold; and
a first transmitter that transmits a detection notification indicating a detection of the congested state to the second relay device when the congested state is detected, the first transmitter terminating transmission of the detection notification when the detector detects that the congested state is resolved, and
the second relay device comprises:
a plurality of ports that input and output data packets;
a storage which represents a relationship between media access control addresses (MAC addresses) of the source terminals that are the source of the input data packets to the second relay device and ports of the second relay device through which the data packets are input, and further represents destinations to which the input data packets are to be transferred and identification information of ports that outputs the input data packets are associated with each other for each of the plurality of ports;
a receiver that receives the detection notification from the first relay device; and
a second transmitter that obtains, from the storage, destinations associated with a respective port connected to the first relay device out of the plurality of ports when the detection notification is received, and that transmits a notification of congestion including the MAC addresses of the source terminals in response to the received detection notification to the obtained destinations by using the associated port which is also a port to which the detection notification is input through the first relay device that further forwards the notification of congestion to the source terminals, the source terminals being associated with the destinations.

2. The network relay system according to claim 1, wherein the second transmitter transmits the notification of congestion in which identification information of a destination of the notification of congestion is included.

3. The network relay system according to claim 1, wherein the first relay device further comprises a third transmitter that transmits the notification of congestion in which identification information of a destination of the notification of congestion is included when identification information of the destination sent from the second relay device in response to the detection notification transmitted by the first transmitter is received.

4. The network relay system according to claim 1, wherein the second relay device is a layer-2 switch, and the storage is a forwarding database (FDB) in the layer-2 switch, in which the destinations are indicated by media access control addresses (MAC addresses).

5. A network relay device comprising:
a plurality of ports that input and output data packets, wherein the input data packets are received from source terminals;
a storage in which a relationship between media access control addresses (MAC addresses) of the source terminals that are the source of the input data packets to the network relay device and ports of the network relay device through which the data packets are input, and in which destinations to which the input data packets are to be transferred and identification information of ports that outputs the input data packets are associated with each other for each of the plurality of ports; and
a receiver which receives a detection notification indicating a detection of a congested state of traffic from an output-source device that outputs a data packet responsible for the congested state;
a first transmitter that obtains, from the storage, destinations associated with a respective port to which the data packet responsible for the congested state of traffic is input out of the plurality of ports when the receiver receives the detection notification, and that transmits a notification of congestion including the MAC addresses of the source terminals in response to the received detection notification to the obtained destinations by using the associated port which is also a port to which the detection notification is input through the output-source device that further forwards the notification of congestion to the source terminals, the source terminals being associated with the destinations;
a detector which detects a congested state of traffic for each of the ports from which a data packet is output, the detector detecting the congested state by detecting that a length of a queue in which a data packet to be output from the port is temporarily stored exceeds a specified first threshold, and after the congested state is detected, detecting that the congested state is resolved by detecting that the length of the queue becomes smaller than a specified second threshold that is shorter than the specified first threshold; and a second transmitter which transmits a new detection notification to an output-destination device that is connected to the port at which the congested state is detected, the second transmitter terminating transmission of the new detection notification when the detector detects that the congested state is resolved.

6. The network relay device according to claim 5, wherein the first transmitter transmits the notification of congestion in which identification information of a destination of the notification of congestion is included.

7. The network relay device according to claim 5, further comprising a third transmitter that transmits a new notification of congestion in which identification information of a destination of the new notification of congestion is included when identification information of the destination sent from the output-destination device in response to the new detection notification transmitted by the second transmitter is received.

8. The network relay device according to claim 5, wherein the network relay device is a layer-2 switch, and the storage is a forwarding database (FDB) in the layer-2 switch, in which the destinations are indicated by media access control addresses (MAC addresses).

9. A method of reporting that a congested state of traffic of data packets occurred in a network relay system which comprises a first relay device and a second relay device, the method comprising:
detecting a congested state of data traffic transferred from a port connected to the second relay device, by detecting that a length of a queue in which a data packet to be output from the port is temporarily stored exceeds a specified first threshold by the first relay device that has a port which inputs and outputs data packets, wherein the input data packets are received from source terminals;
detecting that the congested state is resolved by detecting by the first relay device that the length of the queue becomes smaller than a specified second threshold that is shorter than the specified first threshold after the congested state is detected;
transmitting a detection notification indicating a detection of the congested state to the second relay device by the first relay device when the congested state is detected and terminating the transmission of the detection notification by the first relay device when it is detected that the congested state is resolved;
receiving the detection notification from the first relay device by the second relay device that comprises a plurality of ports which input and output data packets;
obtaining, from a storage that stores a relationship between media access control addresses (MAC addresses) of the source terminals that are the source of the input data packets to the second relay device and ports of the second relay device through which the data packets are input, and that further stores destinations to which the input data packets are to be transferred and identification information of ports that outputs the input data packets are associated with each other for each of the plurality of ports, destinations associated with a respective port connected to the first relay device when the detection notification is received by the second relay device, and transmitting a notification of congestion including the MAC addresses of the source terminals in response to the received detection notification to the obtained destinations by using the associated port which is also a port to which the detection notification is input through the first relay device that further forwards the notification of congestion to the source terminals, the source terminals being associated with the destinations.

10. A method of reporting that a congested state of traffic of data packets occurred in a network relay system by a relay device included in the network relay system, the method comprising:

receiving a detection notification indicating a detection of a congested state of traffic from an output-source device that outputs a data packet responsible for the congested state of traffic by using the relay device that comprises a plurality of ports which input and output data packets, wherein the input data packets are received from source terminals;

referring to a storage in which a relationship between media access control addresses (MAC addresses) of the source terminals that are the source of the input data packets to the relay device and ports of the relay device through which the data packets are input, and in which destinations to which the input data packets are to be transferred and identification information of ports that outputs the input data packets are associated with each other for each of the plurality of ports by using the relay devices;

obtaining, from the storage, destinations associated with a port to which a respective data packet responsible for the congested state of traffic is input out of the plurality of ports, when the detection notification is received, and transmitting a notification of congestion including the MAC addresses of the source terminals in response to the received detection notification to the obtained destinations by using the relay device and by using the associated port which is also a port to which the detection notification is input through the output-source device that further forwards the notification of congestion to the source terminals, the source terminals being associated with the destinations;

detecting a congested state of traffic for each of the ports from which a data packet is output by detecting that a length of a queue in which a data packet to be output from the port is temporarily stored exceeds a specified first threshold by using the relay device;

transmitting a new detection notification to an output-destination device that is connected to the port at which the congested state is detected by using the relay device;

detecting that the congested state is resolved by detecting that the length of the queue becomes smaller than a specified second threshold that is shorter than the specified first threshold by using the relay device; and terminating the transmission of the new detection notification by using the relay device when it is detected that the congested state is resolved.

11. A non-transitory computer readable storage medium in which a program is recorded for making a relay device to report that a congested state of traffic of a data packet occurred in the network relay system, by using a processor to control the relay device which is included in a network relay system and which comprises a plurality of ports which input and output data packets, wherein the input data packets are received from source terminals, the program directing a computer to perform a process, the process comprising:

receiving a detection notification indicating a detection of a congested state of traffic from an output-source device that outputs a data packet responsible for the congested state of traffic by using the relay device;

referring to a storage in which a relationship between media access control addresses (MAC addresses) of the source terminals that are the source of the input data packets to the relay device and ports of the relay device through which the data packets are input, and in which destinations to which input data packets are to be transferred and identification information of ports that outputs the input data packets are associated with each other for each of the plurality of ports;

obtaining, from the storage, destinations associated in the storage with a respective port to which a data packet responsible for the congested state of traffic is input out of the plurality of ports when the detection notification is received, and transmitting a notification of congestion including the MAC addresses of the source terminals in response to the received detection notification to the obtained destinations by using the relay device and by using the associated port which is also a port to which the detection notification is input through the output-source device that further forwards the notification of congestion to the source terminals, the source terminals being associated with the destinations;

detecting a congested state of traffic for each of the ports from which a data packet is output by detecting that a length of a queue in which a data packet to be output from the port is temporarily stored exceeds a specified first threshold;

transmitting a new detection notification to an output-destination device that is connected to the port at which the congested state is detected by using the relay device;

detecting that the congested state is resolved by detecting that the length of the queue becomes smaller than a specified second threshold that is shorter than the specified first threshold; and terminating the transmission of the new detection notification by using the relay device when it is detected that the congested state is resolved.

* * * * *